US009182029B2

(12) United States Patent
Fenayon et al.

(10) Patent No.: US 9,182,029 B2
(45) Date of Patent: Nov. 10, 2015

(54) MECHANICAL SYSTEM WITH ONE-WAY CLUTCH AND ALTERNATOR COMPRISING SUCH A SYSTEM

(71) Applicant: Aktiebolaget SKF, Gothenburg (SE)

(72) Inventors: Ludovic Fenayon, Montbazon (FR); Alain Gezault, Vineuil (FR); Eve Goujon, Saint Just Saint Rambert (FR); Jean-Marie Guegan, Monnaie (FR); Torbjorn Hedman, St Cyr sur Loire (FR); Jean-Luc Jadeau, Semblancay (FR); Romuald Lescorail, St. Laurent en Gâtines (FR); Yves-André Liverato, Saint Paterne Racan (FR); Herve Maury, La Membrolle sur Choisille (FR); Eric Robert, Saint Cyr sur Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 33 days.

(21) Appl. No.: 13/941,656

(22) Filed: Jul. 15, 2013

(65) Prior Publication Data
US 2014/0027235 A1    Jan. 30, 2014

(30) Foreign Application Priority Data

Jul. 13, 2012 (FR) ........................................ 1256819

(51) Int. Cl.
| | |
|---|---|
| *F16H 55/36* | (2006.01) |
| *F16D 41/067* | (2006.01) |
| *F16D 41/06* | (2006.01) |
| *F16C 25/08* | (2006.01) |
| *F16C 33/58* | (2006.01) |

(Continued)

(52) U.S. Cl.
CPC .............. *F16H 55/36* (2013.01); *F16C 19/547* (2013.01); *F16C 25/083* (2013.01); *F16C 33/588* (2013.01); *F16D 41/06* (2013.01); *F16C 19/163* (2013.01)

(58) Field of Classification Search
USPC ......................... 192/45.004, 45.006; 384/563
See application file for complete search history.

(56) References Cited

U.S. PATENT DOCUMENTS 2,631,072 A * 3/1953 Montgomery ................ 384/563
3,726,576 A * 4/1973 Barnbrook et al. ........... 384/563

(Continued)

FOREIGN PATENT DOCUMENTS

| EP | 1911994 A1 | 4/2008 |
|---|---|---|
| EP | 2249050 A1 | 11/2010 |

(Continued)

*Primary Examiner* — Rodney H Bonck
(74) *Attorney, Agent, or Firm* — Bryan Peckjian; SKF USA Inc. Patent Dept.

(57) ABSTRACT

The present invention relates to a mechanical system with a one-way clutch, for example a pulley for a motor vehicle alternator, comprising a first element and a second element which are able to move one with respect to the other in rotation about a central axis and delimit an annular housing radially to the central axis, a one-way clutch device arranged in the annular housing, and at least one rolling bearing arranged in the annular housing. The mechanical system is characterized in that the rolling bearing comprises at least one pressed ring distinct from the constituent elements of the one-way clutch device. The invention also relates to an alternator comprising such a mechanical system configured as a pulley with a one-way clutch.

20 Claims, 4 Drawing Sheets

(51) Int. Cl.
*F16C 19/54* (2006.01)
*F16C 19/16* (2006.01)

(56) References Cited

U.S. PATENT DOCUMENTS

| | | | | |
|---|---|---|---|---|
| 3,934,957 | A * | 1/1976 | Derner | 384/563 |
| 7,258,215 | B2 * | 8/2007 | Ikeda | 192/110 B |
| 2001/0037926 | A1 * | 11/2001 | Ouchi | 192/45 |
| 2002/0060117 | A1 * | 5/2002 | Nakamura et al. | 192/45 |
| 2010/0178003 | A1 * | 7/2010 | Rusteberg et al. | 384/563 |
| 2014/0034438 | A1 * | 2/2014 | Fenayon et al. | 192/45.004 |
| 2014/0034439 | A1 * | 2/2014 | Fenayon et al. | 192/45.004 |

FOREIGN PATENT DOCUMENTS

| | | |
|---|---|---|
| FR | 2726059 A | 4/1996 |
| FR | 2826413 A1 | 12/2002 |
| FR | 2827923 A1 | 1/2003 |
| GB | 601787 A | 5/1948 |
| WO | 2011079963 | 7/2011 |

* cited by examiner

MECHANICAL SYSTEM WITH ONE-WAY CLUTCH AND ALTERNATOR COMPRISING SUCH A SYSTEM

CROSS-REFERENCE TO RELATED APPLICATION

This application is a U.S. Non-Provisional Utility Patent Application claiming the benefit of French Patent Application Number 1256819 filed on 13 Jul. 2012, which is incorporated herein in its entirety. Applicants respectfully note, 13 Jul. 2013 falls on a Saturday; therefore, Applicants are afforded through the next business day to maintain copendency.

TECHNICAL FIELD

The present invention relates to a mechanical system with a one-way clutch, for example a pulley for a motor vehicle alternator. The invention also relates to an alternator comprising such a mechanical system, configured as a pulley with one-way clutch.

BACKGROUND ART

In the known way, a transmission belt drives an external rim of an alternator pulley, driving an internal hub. This pulley is subjected to numerous variations in speed and torque while it is in service, notably because of the non-cyclic nature of the engine. There are various ways of smoothing these variations in speed and torque applied to the pulley, for example by fitting what is known as a one-way clutch (OWC) device, also known as a free wheel, between the hub and the rim. In one direction of rotation, the one-way clutch device transmits the torque from the hub to the rim of the pulley, whereas in the other direction of rotation the pulley operates as a free wheel.

WO-A-2011 079 963 and FR-A-2 726 059 each describe a mechanical system of the pulley type for a motor vehicle alternator, comprising two rolling bearings and a one-way clutch device all arranged between a hub and a rim.

In WO-A-2011 079 963, the rolling bearings are radial-contact ball bearings and their rings are machined. The clutch device comprises cams, and clutch trackways formed directly on the hub and the rim.

In FR-A-2 726 059, the rolling bearings are radial-contact roller or ball bearings. The device comprises clutch trackways, which can be formed directly on the hub and the rim. As an alternative, the clutch trackways may be formed on pressed rings, which are common to the clutch device and to the rolling bearings. In that case, the multifunctionality of the rings is reduced because these rings cannot be adapted in terms of material, finish, functionality and performance specifically to the clutch device or to the rolling bearings. In addition, the axial and radial clearances internal to the system are more difficult to control when the clutch device and the rolling bearings are adjacent but separate.

DISCLOSURE OF INVENTION

It is an object of the present invention to propose an improved mechanical system.

To this end, one subject of the invention is a mechanical system with one-way clutch, for example a pulley for a motor vehicle alternator, comprising a first element and a second element which are able to move one with respect to the other in rotation about a central axis and delimit an annular housing radially to the central axis, a one-way clutch device arranged in the annular housing, and at least one rolling bearing arranged in the annular housing. The mechanical system is characterized in that the rolling bearing comprises at least one pressed ring distinct from the constituent elements of the one-way clutch device.

Thus, the invention makes it possible to improve the operation and durability of the mechanical system because each of its constituent elements can be adapted specifically to suit its function. In particular, at least one pressed ring is separate from the member or members forming the clutch trackways of the one-way clutch device, which can have a special finish applied to them, for example they can be machined or surface coated. In addition, the pressed rings have a low cost of manufacture by comparison with machined rings. In addition, the invention improves the control over the axial clearances and the axial load within the system.

According to other advantageous features of the invention, considered in isolation or in combination:

The pressed ring is distinct from a member or members forming a clutch trackway of the one-way clutch device.

The one-way clutch device comprises at least one member that forms a clutch trackway and is distinct from the first element and the second element.

The first element and/or the second element form a clutch trackway for the one-way clutch device.

The mechanical system also comprises at least one second rolling bearing including at least one pressed ring distinct from the constituent elements of the one-way clutch device.

The rolling bearing or at least one of the rolling bearings with which the mechanical system is equipped is an angular-contact bearing.

The rolling bearings with which the mechanical system is equipped are angular-contact bearings and are arranged one on each side of the one-way clutch device along the central axis, notably in an O or X setup.

The rolling bearing or at least one of the rolling bearings with which the mechanical system is equipped includes two pressed rings distinct from the constituent elements of the one-way clutch device.

The or at least one of the pressed rings with which the rolling bearing is equipped comprises a discontinuity that is radial overall, forming a means of attachment of this rolling bearing to the first element or the second element.

The mechanical system also comprises a pressing member for pressing against the pressed ring, which is designed to control the internal clearance of the rolling bearing equipped with this pressed ring.

Another subject of the invention is an alternator comprising such a mechanical system configured as a pulley with a one-way clutch.

BRIEF DESCRIPTION OF DRAWINGS

The invention will be better understood on reading the description which will follow, given solely by way of non-limiting example and made with reference to the attached drawings in which.

DETAILED DESCRIPTION

Figure 1:
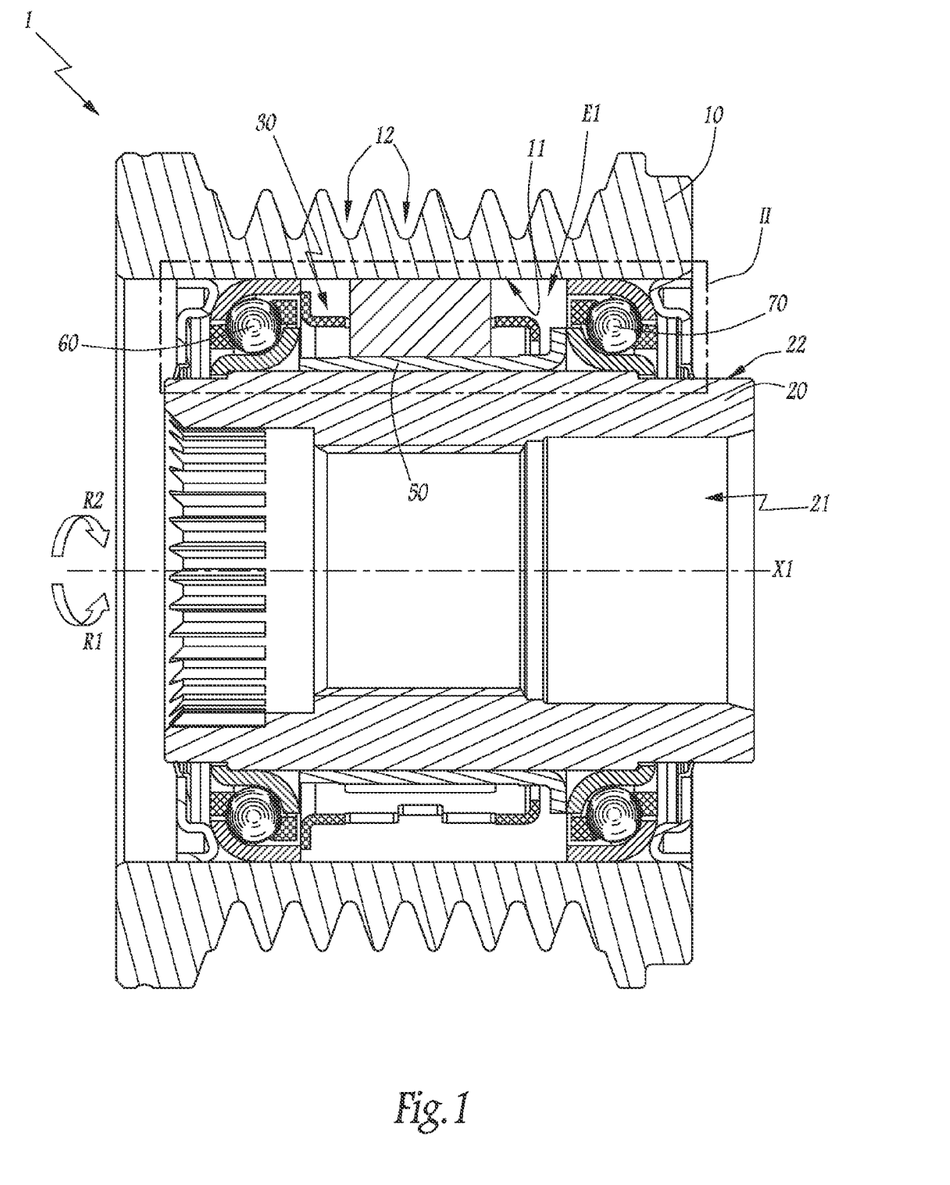
FIG. 1 is a view in axial section of a mechanical system according to the invention, of the alternator pulley type, comprising rolling bearings and a one-way clutch device all arranged between a rim and a hub.
Figure 2:
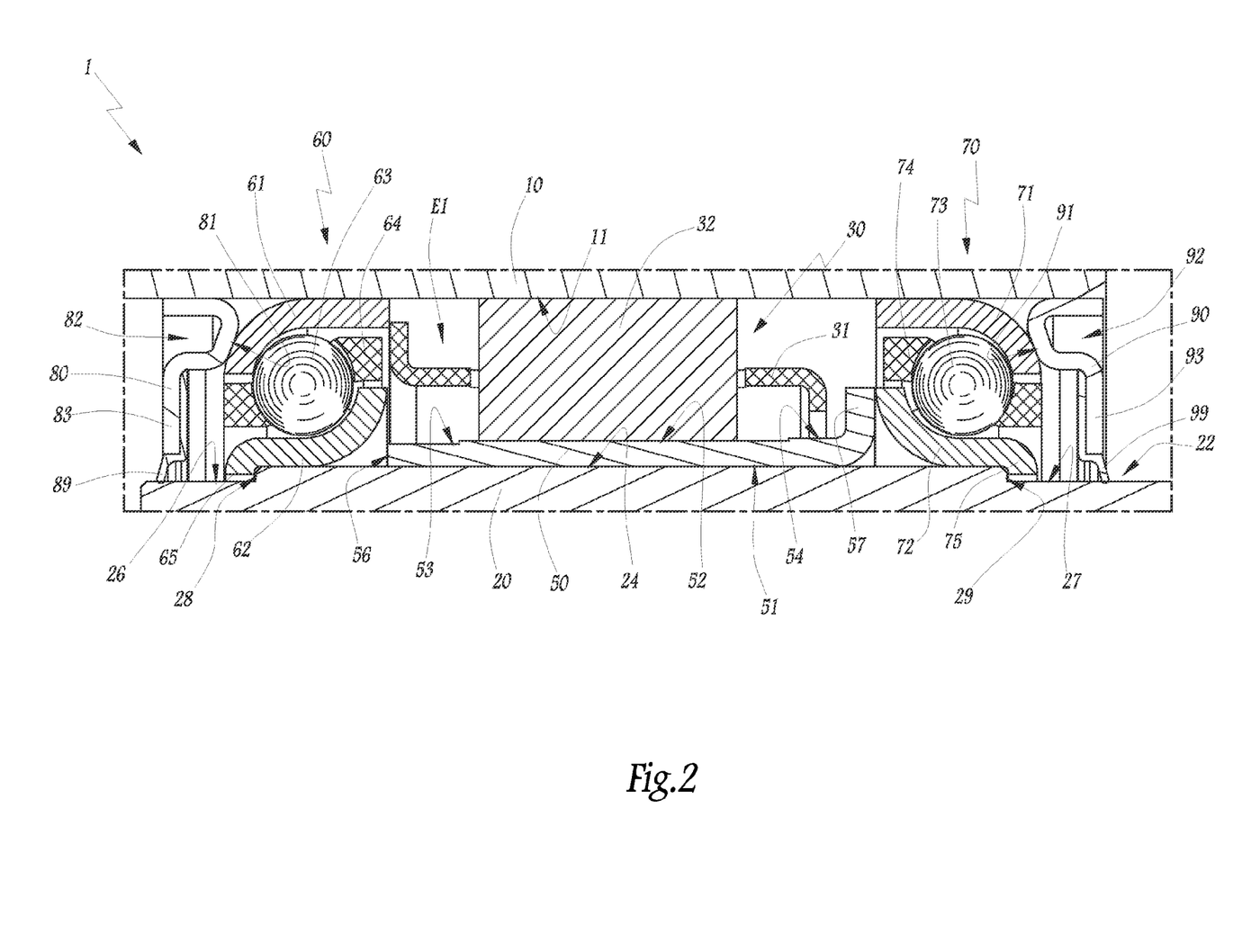
FIG. 2 is a view on a larger scale of detail II of FIG. 1.

FIGS. 1 and 2 depict a pulley 1 according to the invention. The pulley 1 is designed to be fitted to a motor vehicle alternator, which for the purposes of simplification has not been depicted.

The pulley 1 is centered on a central axis X1 and comprises an external rim 10, an internal hub 20, a one-way clutch device 30, a member 50, two rolling bearings 60 and 70 and two lateral shrouds 80 and 90. The rim 10 and the hub 20 delimit a housing E1, of annular profile, about the axis X1. The elements 30, 50, 60, 70, 80 and 90 are arranged in this housing E1.

The rim 10 and the hub 20 are able to move one relative to the other in rotation about the central axis X1. The rim 10 comprises external grooves 12 configured partially to receive a transmission belt, while the hub 20 comprises an internal bore 21 configured to receive an alternator shaft, the belt and the shaft not having been depicted for the sake of simplicity. The rim 10 also comprises an internal cylindrical bore 11, while the hub 20 comprises an external land 22, together delimiting the housing E1. The land 22 comprises a central cylindrical surface 24 and two lateral cylindrical surfaces 26 and 27 having diameters slightly smaller than that of the surface 24, which run parallel to the axis X1. The surfaces 26 and 27 are connected to this surface 24 by shoulders 28 and 29 respectively, which run radially to the axis X1.

The device 30 arranged in the housing E1 allows the rim 10 to be engaged with respect to the hub 20 which is capable of rotating in a first direction of rotation R1 about the central axis X1 and, conversely, allows the rim 10 to be disengaged from the hub 20 in a second direction of rotation R2 which is the opposite of the first direction of rotation R1. In the example of FIGS. 1 and 2, the device 30 comprises a cage 31 surrounding the axis X1, and cams 32 which are held by the cage 31. The cams 32 are distributed about the axis X1 and articulated such that they can rotate with respect to the cage 31, each about an axis parallel to the axis X1. Just one cam 32 positioned above the axis X1 has been depicted in FIG. 1 for the sake of simplicity. The clutch is engaged through interaction between the cams 32 and clutch trackways, which rotate as one with the first element 10 or with the second element 20. In the context of the invention, the clutch trackways form part of elements that form integral parts of the clutch device 30.

Another example of a one-way clutch device 30 is described in document WO-A-2011 079 963.

As shown in FIGS. 1 and 2, the member 50 is configured like an annular ring centered on the axis X1. This member 50 is arranged between the rolling bearings 60 and 70 in the housing E1, or in other words, is distinct from the rolling bearings 60 and 70. The member 50 comprises an internal cylindrical bore 51, and external cylindrical surfaces 52, 53 and 54, which are centered on the axis X1. On the same side as the rolling bearing 60, the member 50 comprises an edge 56, which is configured as a radial annular surface and connects the surfaces 51 and 53. On the same side as the rolling bearing 70, the member 50 comprises a part 57, which runs radially away from the axis X1 from the surfaces 51 and 54. The member 50 may be pressed, notably produced by pressing sheet metal. The surfaces 52, 53 and/or 54, which have different diameters, may be machined.

The rolling bearings 60 and 70 are positioned beside the device 30 in the housing E1, on each side of this device 30 along the central axis X1. The rolling bearing 60 has an outer ring 61 and an inner ring 62 between which rolling elements 63 of the ball type, held by a cage 64, are interposed. The rolling bearing 70 comprises an outer ring 71 and an inner ring 72 between which rolling elements 73 of the ball type held by a cage 74 are interposed. The rolling bearings 60 and 70 are angular-contact rolling bearings mounted in an X configuration in the example of FIGS. 1 and 2. As an alternative, the rolling bearings 60 and 70 may be arranged in an O setup. In the context of the invention, the rings 61, 62, 71 and 72 are pressed, notably produced by pressing sheet metal.

Furthermore, the internal rings 62 and 72 each comprise a radial discontinuity, 65 and 75 respectively, forming a means of attachment of the rolling bearing 60 or 70 to the hub 20. The discontinuity 65 presses against the shoulder 28, while the discontinuity 75 presses against the shoulder 29. Collaboration between the discontinuities 65 and 75 and the shoulders 28 and 29 allows the rolling bearings 60 and 70 to be positioned accurately along the axis X1. Also, this interaction holds the rolling bearings 60 and 70 axially in position, as detailed hereinafter in connection with the shrouds 80 and 90. In other words, each radial discontinuity 65 or 75 forms an axial end stop built into the ring 62 or 72. Thus, the discontinuities 65 and 75 allow control over the axial clearance between the rolling bearings 60 and 70 and axial load applied to these rolling bearings 60 and 70.

In practice, the surfaces 11 and 52 form the clutch trackways of the device 30, these respectively facing towards and away from the axis X1. The surface 52 is smooth and preferably has a wear-resistant coating or some other surface treatment suited to the present application. As an alternative, the surface 52 may be grooved or toothed in order to increase friction and increase the wedging of the cams 32 against the clutch trackway. Likewise, the surface 11 may have a wear-resistant coating in the region intended to be in contact with the cams 32.

Within the scope of the invention, the pressed rings 61, 62, 71 and 72 of the rolling bearings 60 and 70 are distinct from the members 10 and 50 that form the clutch trackways 11 and 52. The trackway 11 is formed directly on the rim 10 whereas the trackway 52 is formed by the member 50 distinct from the hub 20. Each element 10, 50, 61, 62, 71 and 72 may thus have a shape, a material and an arrangement all suited to its function, something which is not the case in existing systems in which the bearing rings and bearing raceways are formed as one and the same single piece.

For preference, the member 50 is in contact with just one ring of a bearing 60 or 70. In this particular instance, the edge 56 is not in contact with the ring 62 of the rolling bearing 60, whereas the part 57 is in contact with the ring 72 of the rolling bearing 70. As an alternative, the member 50 is not in contact with either ring 62 or 72. Thus, the member 50 does not hamper the setting of the axial clearance of the rolling bearings 60 and 70, as detailed hereinafter.

The lateral shrouds 80 and 90 associated with the rolling bearings 60 and 70 respectively provide control over the axial clearance within these rolling bearings 60 and 70 and within the system 1. To do that, the shroud 80 comprises a pressing surface 81 for pressing against the rolling bearing 60, whereas the shroud 90 comprises a pressing surface 91 for pressing against the rolling bearing 70. The discontinuities 65 and 75 form means of retaining the rolling bearings 60 and 70 in the axial direction when the shrouds 80 and 90 are pressing against these rolling bearings 60 and 70.

The shroud 80 is arranged against the rolling bearing 60, on the outside of the housing E1, on the other side of the rolling bearing 60 from the device 30. The shroud 80 comprises a U-shaped external part 82 on which the surface 81 is formed, and an internal part 83, which connects to the part 82 and extends radially to the axis X1. The part 82 is fitted against the surface 11 of the rim 10. The part 83 supports a seal 89, which is arranged in sealed contact with the surface 26 of the hub 20. The position of the shroud 80 along the axis X1 can be adjusted, such that the load applied by the surface 81 to the outer ring 61 can be adjusted, making it possible to control the axial clearance internal to the rolling bearing 60. At the same time, the discontinuity 65 forms a means of retention of the inner ring 62 in the axial direction parallel to the axis X1.

By way of example, the position of the shroud 80 can be adjusted by screwing into the rim 10 and, more specifically, by screwing the part 82 with respect to the surface 11, although for the sake of simplicity, the complementary screw threads and tappings have not been depicted in the figures. In another example, the shroud 80 may be push fitted into the rim 10 and moved by axial pressure. Once in situ, the shroud 80 can be fixed to the rim 10 and/or to the ring 61 by clamping, crimping, bonding or welding. As an alternative, the shroud 80 may be adjusted and/or fixed in position by any means suited to the present application.

Likewise, the shroud 90 is arranged against the rolling bearing 70, on the outside of the housing E1, and on the other side of the rolling bearing 70 from the device 30. The shroud 90 comprises a U-shaped external part 92 on which the surface 91 is formed, and an internal part 93, which connects to the part 92 and extends radially to the axis X1. The part 93 supports a seal 99, which is arranged in sealed contact with the surface 27 of the hub 20. The position of the shroud 90 along the axis X1 is adjustable, so that the load applied by the surface 91 to the outer ring 71 is adjustable, making it possible to control the axial clearance internal to the rolling bearing 70. At the same time, the discontinuity 75 forms a means of retention of the inner ring 72 in the axial direction parallel to the axis X1. The means for adjusting and fixing the position of the shroud 90 are comparable to those of the shroud 80.

Because the rolling bearings 60 and 70 are angular-contact bearings, the radial clearance is connected with the axial clearance internal to each of these rolling bearings 60 and 70. The pressed rings 61 and 71 are curved, with their concave side forming the raceway for the balls 63 and 73 respectively. The pressing surfaces 81 and 91 are inclined with respect to the radial parts 83 and 93 and to the convex external surface of the rings 61 and 71, facing the balls 63 and 73. Thus, the shrouds 80 and 90 also make it possible to control the radial clearance internal to each rolling bearing 60 and 70 as well as the axial clearance.

Furthermore, adjusting the clearances internal to the rolling bearings 60 and 70 makes it possible to adjust the axial clearance within the system 1, between the rings 61, 62, 71 and 72 of the rolling bearings 60 and 70, the device 30 and the member 50. Conversely, in existing systems comprising a ring that is common to the clutch device and to the rolling bearings, such adjustment of the axial clearance is not possible.

The invention is not restricted to an alternator pulley comprising a hub and a rim. Indeed the invention may be applied to any type of mechanical system 1 comprising a first element 10 and a second element 20 which are able to move one relative to the other in rotation about a central axis X1, and between which a one-way clutch device 30 and at least one rolling bearing 60 are fitted. Clutch engagement is achieved by collaboration between the device 30 and at least one clutch trackway formed by a member that rotates as one with the first element 10 or with the second element 20.

As an alternative that has not been depicted, the cage 31 supporting the cams 32 may be secured to one of the elements 10 or 20. In that case, the cams 32 with which the device 30 is equipped collaborate with just one single clutch trackway.

According to another alternative form of embodiment that has not been depicted, the one-way clutch device 30 may be configured differently from a device involving cams.

According to another alternative form of embodiment that has not been depicted, the pressing members 80 and 90 that press against a pressed ring 61, 62, 71 or 72 may have any shape and/or arrangement suited to the present application. For example, in the case of an O-type setup, the pressing surface 81 may be positioned against the inner ring 62.

According to another alternative form of embodiment that has not been depicted, the system 1 has no member 50, which means that the clutch trackways are formed directly on the rim 10 and the hub 20.

In another alternative form of embodiment that has not been depicted, the radial discontinuity 65 or 75 may be constrained in a groove, a recess or on a level step formed on the land 22.

According to another alternative form of embodiment which has not been depicted, part of the radial discontinuity may be provided on an outer ring 61 and/or 71, when the rolling bearings 60 and 70 are positioned in an O-type setup.

According to another alternative form of embodiment that has not been depicted, the discontinuity 65 or 75 may be slightly inclined, for example at an angle of between 0° and 45°, with respect to the direction radial to the central axis X1. In other words, in this case, the discontinuity 65 or 75 is not strictly radial but may be qualified as a discontinuity that is radial overall, designed to collaborate with the rim 10 or the hub 20 in an axial direction parallel to the central axis X1.

Figure 3:
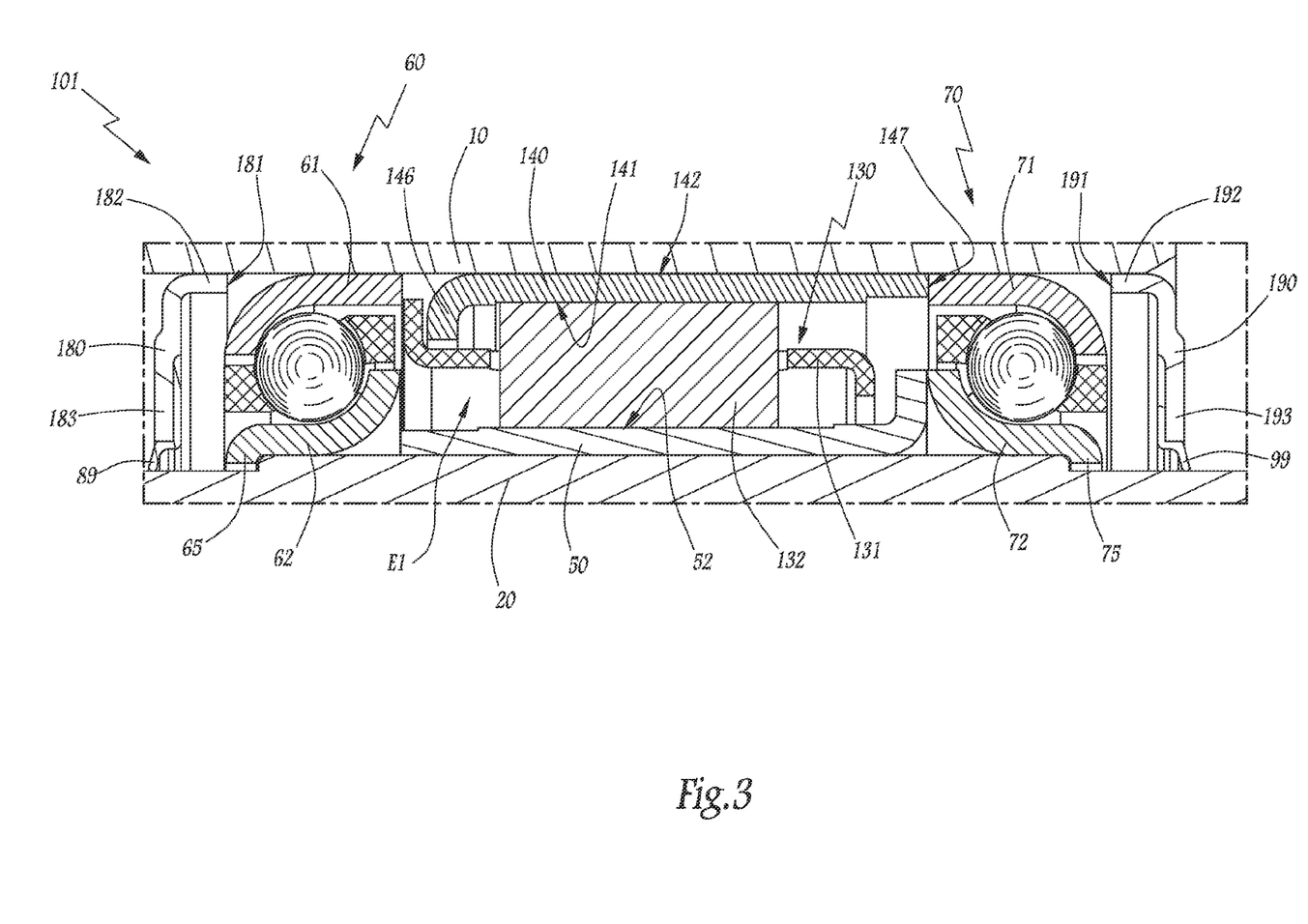
FIG. 3 is a view similar to FIG. 2 of a pulley according to a second embodiment of the invention.

FIG. 3 depicts a second embodiment of a pulley 101.

Certain constituent elements of the pulley 101 are identical to the constituent elements of the pulley 1 of the first embodiment, described above, and bear the same references. These are the elements 10, 20, 50, 60, 70, 89 and 99.

Other constituent elements of the pulley 101 are comparable to the constituent elements of the pulley 101, and bear the same references increased by 100. These are the device 130 comprising a cage 131 and cams 132, and shrouds 180 and 190 comprising pressing surfaces 181 and 191 and parts 182, 183, 192 and 193.

The pulley 101 further comprises a member 140 comparable to the member 50. The member 140 is arranged in the housing E1 between the rolling bearings 60 and 70, facing the member 50. The member 140 is configured like an annular ring centered on the axis X1 and is distinct from the rings 62 and 72 of the rolling bearings 60 and 70. The member 140 comprises an internal cylindrical bore 141 and an external cylindrical surface 152, which are centered on the axis X1. On the same side as the rolling bearing 60, the member 140 comprises a part 146, which extends radially away from the axis X1. On the same side as the rolling bearing 70, the member 140 comprises an edge 147, which is configured like a radial annular surface. The member 140 can be produced by pressing.

In practice, the surfaces 52 and 141 form the clutch trackways of the device 130 facing respectively away from and towards the axis X1. The surfaces 52 and 141 are smooth and preferably have a wear-resistant coating. As an alternative, the surfaces 52 and 141 may be grooved or toothed to increase friction and the jamming of the cams 132 on the clutch trackway. According to the invention, the pressed rings 61, 62, 71 and 72 of the rolling bearings 60 and 70 are distinct from the members 50 and 140 that form the clutch trackways 52 and 141.

The shrouds 180 and 190 have a slightly different structure, but a similar operation, by comparison with the shrouds 80 and 90 of the first embodiment. The shrouds 180 and 190 are depicted away from the rolling bearings 60 and 70, before their position has been adjusted and fixed. The external part 182 extends axially from the radial internal part 183 as far as the pressing surface 181. The external part 192 extends axially from the radial internal part 193 to the pressing surface 191. More specifically, an edge corner of the surfaces 181 and 191 will press against the rings 61 and 71 because of their curved profile. Furthermore, the shrouds 180 and 190 can be adjusted and fixed in position by means comparable to those used for the shrouds 80 and 90.

Figure 4:
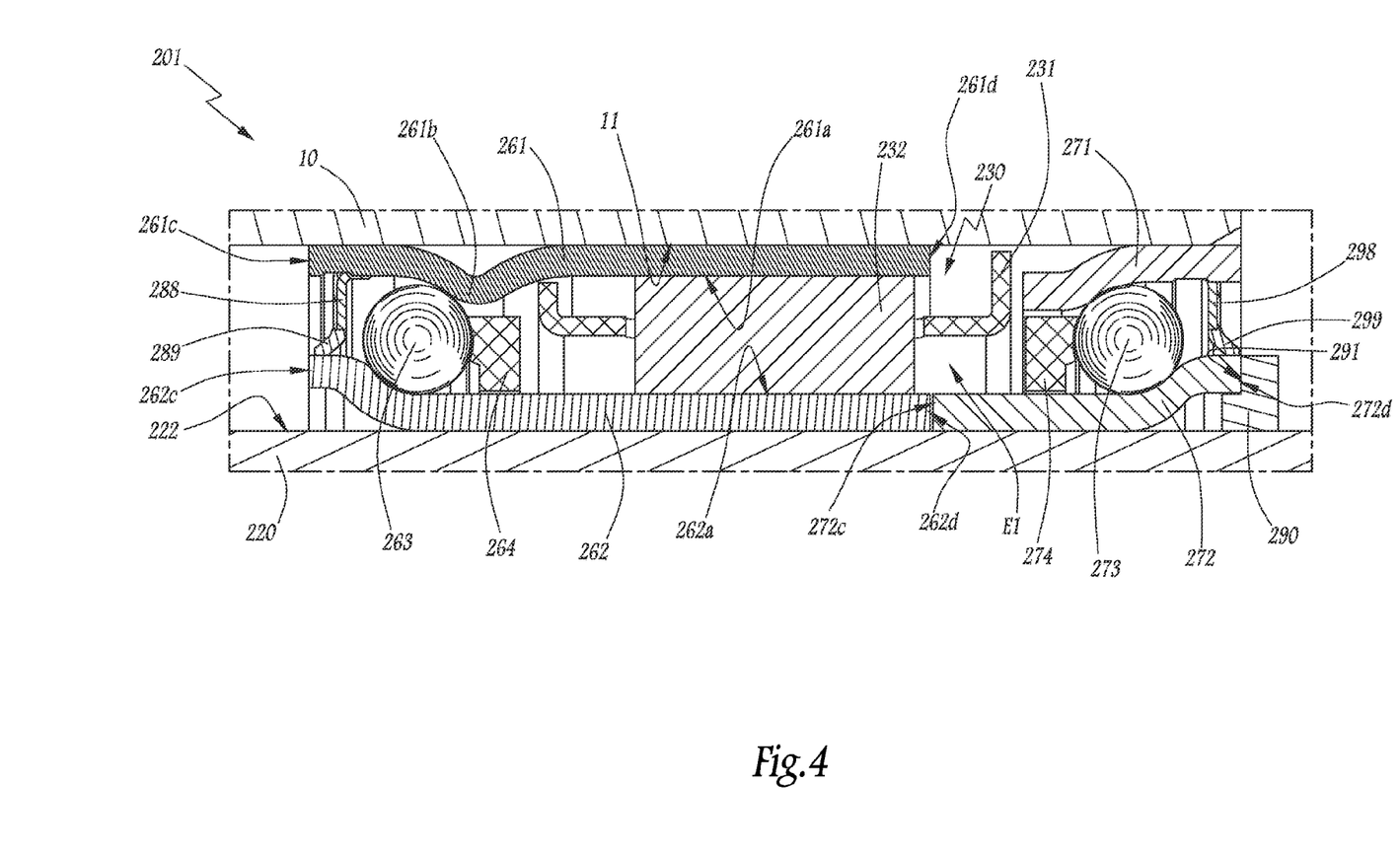
FIG. 4 is a view similar to FIGS. 2 and 3 of a pulley according to a third embodiment of the invention.

FIG. 4 depicts a third embodiment of a pulley 201.

Certain constituent elements of the pulley 201 are identical to the constituent elements of the pulley 1 of the first embodiment, described above, and bear the same references. These are the elements 10, 20, 50, 60, 70, 89 and 99.

Certain constituent elements of the pulley 201 are identical to the constituent elements of the pulley 1 of the first embodiment, described above, and bear the same references increased by 200. These are the hub 220 equipped with an external land 222, the device 230 comprising a cage 231 and cams 232, the rolling bearing 260 comprising an external ring 261, an internal ring 262, balls 263 and a cage 264, the rolling bearing 270 comprising an external ring 271, an internal ring 272, balls 273 and a cage 274, and seals 289 and 288.

The main differences from the previous embodiments are to do with the fact that the rings 261 and 262 of the rolling bearing 260 form the clutch trackways, the absence of members 50 and 140, and the presence of a packing piece 290. Furthermore, the seal 289 is borne by a support piece 288 secured to the ring 261, whereas the seal 299 is borne by a support piece 298 secured to the ring 271. The land 222 is a cylindrical external surface without flat levels by comparison with the land 22. The rings 261, 262, 271 and 272 of the rolling bearings 260 and 270 are produced by pressing. The rolling bearings 260 and 270 are angular-contact rolling bearings in an I-type setup.

The outer ring 261 comprises an internal surface 261a that forms both the clutch trackway for the device 230 and the raceway for the balls 263. The ring 261 comprises a part 261b, which is deformed in the direction of the axis X1, or in other words which diverges from the surface 11 of the rim 10. The ring 261 also comprises two edges 261c and 261d, which are oriented respectively toward the outside of the housing E1 and toward the rolling bearing 270. The part 261b is closer to the edge 261c than to the edge 261d of the ring 261. The inner ring 262 comprises an internal surface 262a that forms both the clutch trackway for the device 230 and the raceway for the balls 263. The ring 262 also comprises two edges 262c and 262d, oriented respectively towards the outside of the housing E1 and towards the rolling bearing 270. The edge 262c is deformed away from the axis X1, or in other words away from the land 222 of the hub 220. The part 261b and the edge 262c allow the surfaces 261a and 262b to have curved profiles making the rolling bearing 260 an angular-contact bearing.

The ring 272 comprises two edges 272c and 272d, oriented respectively towards the rolling bearing 260 and towards the outside of the housing E1. The edge 272d is deformed away from the axis X1, or in other words diverges from the land 222 of the hub 220. The rings 271 and 272 have curved raceways such that the rolling bearing 260 is an angular-contact bearing. The edge 272c runs axially beyond the ring 271, towards the edge 262d of the ring 262. For preference, as shown in FIG. 4, the edges 262d and 272c are not in contact.

The packing piece 290 comprises a pressing surface 291 which butts against the edge 272d. Part of the packing piece 290 can be housed between the land 222 and the ring 272. The packing piece 290 forms a member that presses against the ring 271, and which is designed to control the axial and/or radial clearance internal to the rolling bearing 270. The packing piece 290 can have its position adjusted and fixed by means comparable to those used on the shrouds 80 and 90, and described above.

In practice, the surfaces 261a and 262a form clutch trackways for the device 230, facing respectively toward and away from the axis X1. According to the invention, the pressed rings 271 and 272 of the rolling bearing 270 are distinct from the rings 261 and 262 equipped with the clutch trackways 261a and 262a.

In an alternative form of embodiment that has not been depicted, a first clutch trackway is formed by one of the rings 261 or 262, while the other clutch trackway is formed on the rim 10, on the hub 20 or on a member positioned between the rolling bearings 260 and 270.

Whatever the embodiment, the mechanical system 1, 101 or 201 comprises at least one rolling bearing 60, 70 and/or 270 including at least one pressed ring 61, 62, 71, 72, 271 and/or 272 distinct from the constituent elements 10, 11, 31, 32, 50, 52, 131, 132, 140, 141, 231, 232, 261, 261a, 262, 262a of the one-way clutch device 30, 130 or 230.

Furthermore, all or some of the technical features of the various embodiments can be combined with one another. Thus, the mechanical system may be adapted in terms of cost, functionality and performance.

The invention claimed is:

1. A mechanical system with a one-way clutch for use with a pulley of a motor vehicle engine accessory, the mechanical system comprising:
   a first element and a second element, wherein the first element and the second element are able to move one with respect to one another in rotation about a central axis and delimit an annular housing radially to the central axis;
   a one-way clutch device arranged in the annular housing;
   at least one rolling bearing arranged in the annular housing, the rolling bearing comprising at least one pressed ring distinct from constituent elements of the one-way clutch device; and
   a shroud arranged against one of the at least one pressed ring, wherein a position of the shroud along a rotational axis can be adjusted, such that the load applied by a surface to the at least one pressed ring can be adjusted, making it possible to control the axial clearance internal to the rolling bearing,
   wherein the shroud extends between an internal surface of the first element and a facing internal surface of the second element sealing a span between the internal surface of the first element and the facing internal surface of the second element.

2. The mechanical system according to the claim 1, wherein the pressed ring is distinct from at least one member forming a clutch trackway of the one-way clutch device.

3. The mechanical system according to claim 2, wherein the one-way clutch device comprises at least one member that forms a clutch trackway and the one-way clutch device is distinct from the first element and the second element.

4. The mechanical system according to the claim 1, wherein at least one of the first element and the second element forms a clutch trackway for the one-way clutch device.

5. The mechanical system according to the claim 1, further comprising at least one second rolling bearing including at least one pressed ring distinct from the constituent elements of the one-way clutch device.

6. The mechanical system according to the claim 1, wherein one or more of the at least one rolling bearing with which the mechanical system is equipped is an angular-contact bearing.

7. The mechanical system according to claim 1, wherein the at least one rolling bearing with which the mechanical system is equipped are angular-contact bearings and are arranged one on each side of the one-way clutch device along the central axis in one of an O or X setup.

8. The mechanical system according to claim 1, wherein one or more of the at least one rolling bearing with which the mechanical system is equipped includes two pressed rings distinct from the constituent elements of the one-way clutch device.

9. The mechanical system according to claim 1, wherein one or more of the at least one pressed ring with which the rolling bearing is equipped comprises a discontinuity that is generally radial, forming a coupling for attachment of this rolling bearing to one of the first element and the second element.

10. The mechanical system according to claim 1, the shroud further comprising a seal located at one end thereof, wherein the seal is arranged in sealed contact with one of the internal surface of the first element and the facing internal surface of the second element.

11. An alternator incorporating a one-way clutch, comprising:
an electromechanical device comprising a rotational member for converting rotational mechanical energy to electrical energy a pulley rotatably mounted on the rotational member;
a clutch integrated between the pulley and the rotational member, the clutch comprising:
a first element and a second element, which are able to move one with respect to the other in rotation about a central axis and delimit an annular housing radially to the central axis,
a one-way clutch device arranged in the annular housing, and
at least one rolling bearing arranged in the annular housing, the at least one rolling bearing comprising at least one pressed ring distinct from constituent elements of the one-way clutch device; and
a shroud arranged against one of the at least one pressed ring, wherein a position of the shroud along a rotational axis can be adjusted, such that the load applied by a surface to the at least one pressed ring can be adjusted, making it possible to control the axial clearance internal to the rolling bearing,
wherein the shroud extends between an internal surface of the first element and a facing internal surface of the second element sealing a span between the internal surface of the first element and the facing internal surface of the second element.

12. The alternator according to the claim 11, wherein the pressed ring is distinct from at least one member forming a clutch trackway of the one-way clutch device.

13. The alternator according to claim 12, wherein the one-way clutch device comprises at least one member that forms a clutch trackway and the one-way clutch device is distinct from the first element and the second element.

14. The alternator according to the claim 11, wherein at least one of the first element and the second element forms a clutch trackway for the one-way clutch device.

15. The alternator according to the claim 11, the clutch further comprising at least one second rolling bearing including at least one pressed ring distinct from the constituent elements of the one-way clutch device.

16. The alternator according to the claim 11, wherein one or more of the at least one rolling bearing with which the alternator is equipped is an angular-contact bearing.

17. The alternator according to claim 11, wherein the at least one rolling bearing with which the alternator is equipped are angular-contact bearings and are arranged one on each side of the one-way clutch device along the central axis, notably in one of an O or X setup.

18. The alternator according to claim 11, wherein one or more of the at least one rolling bearing with which the alternator is equipped includes two pressed rings distinct from the constituent elements of the one-way clutch device.

19. The alternator according to claim 11, wherein one or more of the at least one pressed ring with which the rolling bearing is equipped comprises a discontinuity that is generally radial, forming a coupling for attachment of this rolling bearing to one of the first element and the second element.

20. The alternator according to claim 11, the shroud further comprising a seal located at one end thereof, wherein the seal is arranged in sealed contact with one of the internal surface of the first element and the facing internal surface of the second element.

* * * * *